US010939236B1

(12) United States Patent
Fung et al.

(10) Patent No.: US 10,939,236 B1
(45) Date of Patent: Mar. 2, 2021

(54) POSITION SERVICE TO DETERMINE RELATIVE POSITION TO MAP FEATURES

(71) Applicant: Snap Inc., Santa Monica, CA (US)

(72) Inventors: Alexander Fung, New York, NY (US); Leonid Gorkin, Chappaqua, NY (US); Robert Marianski, Astoria, NY (US); Arif Oguz Yildiz, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/206,709

(22) Filed: Nov. 30, 2018

(51) Int. Cl.
*H04W 4/029* (2018.01)
*H04W 4/02* (2018.01)
*G06F 17/18* (2006.01)
*G06F 16/909* (2019.01)
*H04L 29/06* (2006.01)

(52) U.S. Cl.
CPC .......... *H04W 4/023* (2013.01); *G06F 16/909* (2019.01); *G06F 17/18* (2013.01); *H04W 4/029* (2018.02); *H04L 67/42* (2013.01)

(58) Field of Classification Search
CPC .......... G01C 21/3682; G01C 21/3679; G01C 21/26; G06F 16/29; H04W 4/02; H04W 4/021; H04W 4/029; G06N 7/005
See application file for complete search history.

(56) References Cited

U.S. PATENT DOCUMENTS

| | | | | |
|---|---|---|---|---|
| 9,430,858 | B1* | 8/2016 | Har | G01C 21/32 |
| 2014/0095510 | A1* | 4/2014 | Lv | H04L 51/20 |
| | | | | 707/740 |
| 2014/0278063 | A1* | 9/2014 | Beyeler | G06F 16/9537 |
| | | | | 701/426 |
| 2014/0359483 | A1* | 12/2014 | Forutanpour | G06F 16/58 |
| | | | | 715/753 |
| 2015/0169573 | A1* | 6/2015 | Arora | G06F 16/9535 |
| | | | | 707/724 |
| 2015/0186414 | A1* | 7/2015 | Jones | G06F 16/29 |
| | | | | 707/723 |
| 2016/0323711 | A1* | 11/2016 | Spears | H04W 4/029 |
| 2018/0112996 | A1* | 4/2018 | Montell | G06N 7/005 |
| 2020/0003897 | A1* | 1/2020 | Shroff | G01S 17/86 |
| 2020/0088527 | A1* | 3/2020 | Koda | G09B 29/00 |

* cited by examiner

*Primary Examiner* — Liton Miah

(74) *Attorney, Agent, or Firm* — Schwegman Lundberg & Woessner, P.A.

(57) ABSTRACT

Systems, devices, media and methods are presented for retrieving a current location of client device, accessing geographic data based on the current location of the client device, analyzing the geographic data to identify a plurality of geographic features, for each geographic feature of the plurality of geographic features, identifying a direction from the current location of the client device to the respective geographic feature and a confidence level indicating a probability that the current location of the client device is at the direction, returning the direction and the confidence level to the client device, and based on the direction and confidence level, causing presentation of graphical data on a user interface within the client device.

20 Claims, 13 Drawing Sheets

POSITION SERVICE TO DETERMINE RELATIVE POSITION TO MAP FEATURES

TECHNICAL FIELD

Embodiments of the present disclosure relate generally to processing, storing and transmitting position data. More particularly, but not by way of limitation, the present disclosure addresses systems and methods for determining a relative position to various map features and determining the bearing angle and confidence level of the relative position, and to the display of relative position information on a user interface of a computing device.

BACKGROUND

Social media applications implement computer-mediated technologies allowing for the creating and sharing of content that communicates information, ideas, career interests and other forms of expression via virtual communities and networks. Social media platforms use web-based technologies, desktop computers and mobile technologies (e.g., smartphones and tablet computers) to create highly interactive platforms through which individuals, communities and organizations can share, co-create, discuss, and modify user-generated content or pre-made content posted online.

Mobile electronic devices, on which end-user social media applications can be executed, typically provide geolocation services that determine the geographic location of the mobile electronic device, by extension indicating the geographic location of the associated user. Social media content posted by users are often geo-tagged based on the geolocation of a mobile electronic device (such as a mobile phone) by use of which the social media content is captured and/or posted to the social media platform. Social media content may explicitly be geo-tagged by a user using a computer device that does not have activated geolocation services and/or that is not a mobile device (such as a desktop PC).

This disclosure presents various features and functionalities for social media applications using user geolocation data and/or geo-tagged social media content.

BRIEF DESCRIPTION OF THE DRAWINGS

Some aspects of the disclosure are illustrated in the appended drawings. Note that the appended drawings illustrate example embodiments of the present disclosure and cannot be considered as limiting the scope of the disclosure.

To easily identify the discussion of any particular element or act, the most significant digit or digits in a reference number refer to the figure number in which that element is first introduced.

DETAILED DESCRIPTION

The description that follows includes systems, methods, devices, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A position service system aims to determine a user's position relative to various map features, such as roads, buildings, bodies of water, etc. The user request contains information about the user's current location and the position service system returns a list of map features and information describing the user's position relative to the features.

Figure 1:
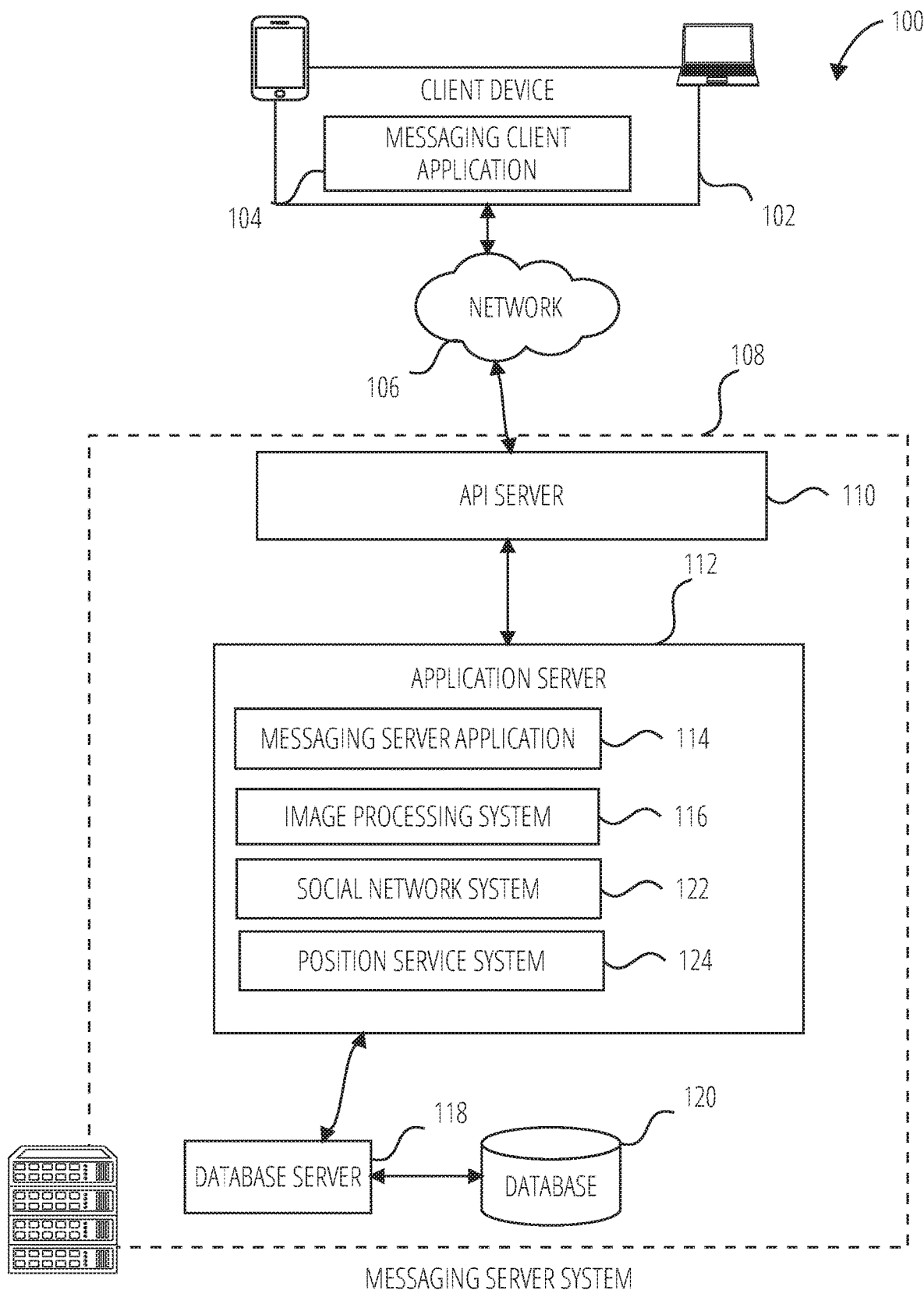
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts several applications including a messaging client application 104. Each messaging client application 104 is communicatively coupled to other instances of the messaging client application 104 and a messaging server system 108 via a network 106 (e.g., the Internet).

Accordingly, each messaging client application 104 can communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116 and a social network system 122. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following", and also the identification of other entities and interests of a particular user.

The application server 112 is communicatively coupled to a database server 118, which facilitates access to a database 120 in which is stored data associated with messages processed by the messaging server application 114.

Figure 2:
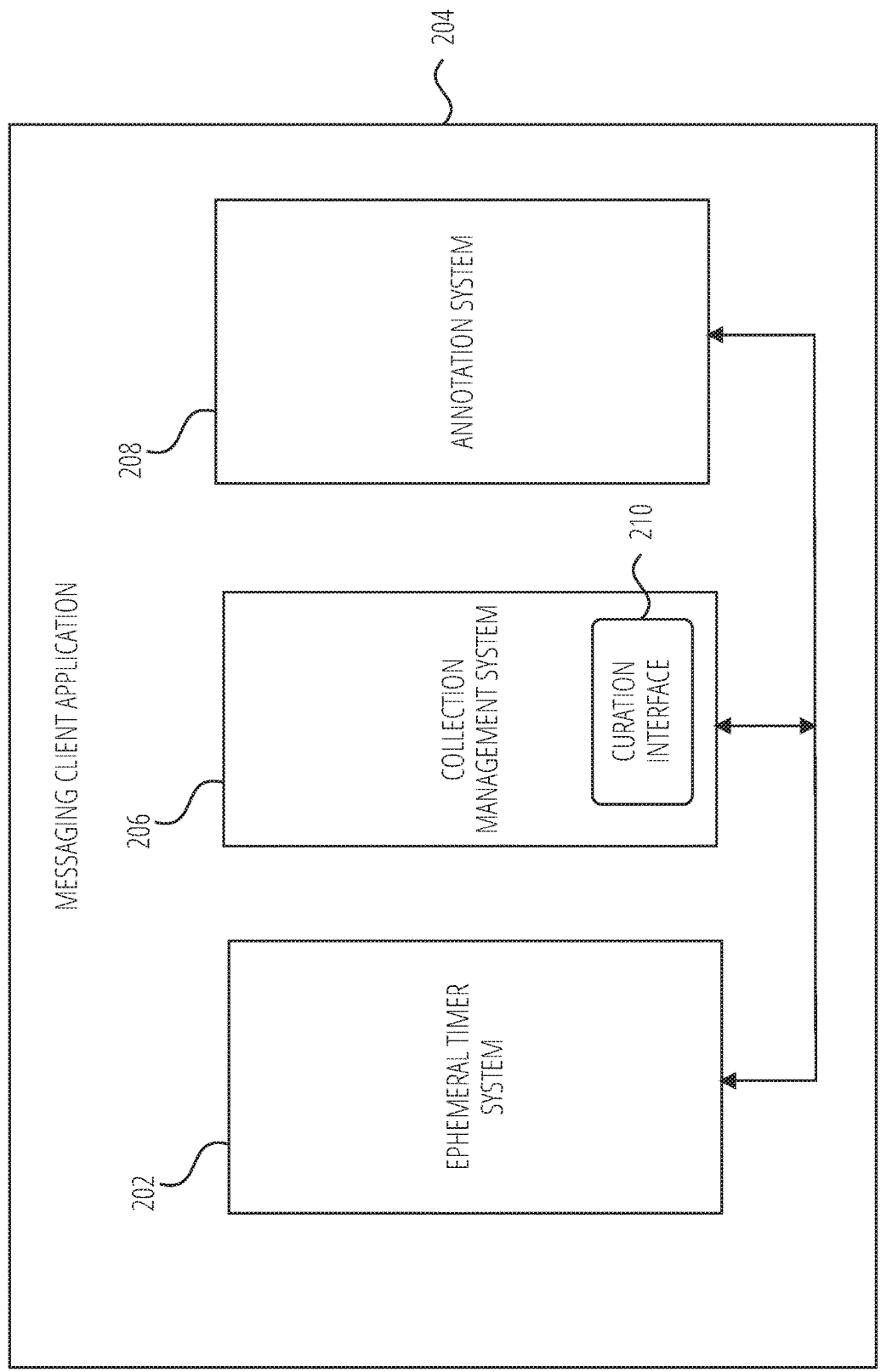
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 204 and the application server 112, which in turn embody a number of some subsystems, namely an ephemeral timer system 202, a collection management system 206 and an annotation system 208.

The ephemeral timer system 202 is responsible for enforcing the temporary access to content permitted by the messaging client application 204 and the messaging server application 114. To this end, the ephemeral timer system 202 incorporates multiple timers that, based on duration and display parameters associated with a message, or collection of messages (e.g., a story), selectively display and enable access to messages and associated content via the messaging client application 204. Further details regarding the operation of the ephemeral timer system 202 are provided below.

The collection management system 206 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 206 may also be responsible for publishing an icon that provides notification of the existence of a particular collection to the user interface of the messaging client application 204.

The collection management system 206 furthermore includes a curation interface 210 that allows a collection manager to manage and curate a particular collection of content. For example, the curation interface 210 enables an event organizer to curate a collection of content relating to a specific event (e.g., delete inappropriate content or redundant messages).

Additionally, the collection management system 206 employs machine vision (or image recognition technology) and content rules to automatically curate a content collection. In certain embodiments, compensation may be paid to a user for inclusion of user generated content into a collection. In such cases, the curation interface 210 operates to automatically make payments to such users for the use of their content.

The annotation system 208 provides various functions that enable a user to annotate or otherwise modify or edit media content associated with a message. For example, the annotation system 208 provides functions related to the generation and publishing of media overlays for messages processed by the messaging system 100. The annotation system 208 operatively supplies a media overlay, modification, enhancement or effect (e.g., a filter) to the messaging client application 204 based on a geolocation of the client device 102. In another example, the annotation system 208 operatively supplies a media overlay to the messaging client application 204 based on other information, such as, social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 208 uses the geolocation of the client device 102, to identify a media overlay that includes the name of a merchant at the geolocation of the client device 102. The media overlay may include other indicia associated with the merchant. The media overlays may be stored in the database 120, and accessed through the database server 118.

In one example embodiment, the annotation system 208 provides a user-based publication platform that enables users to select a geolocation on a map, and upload content associated with the selected geolocation. The user may also specify circumstances under which a particular media overlay should be offered to other users. The annotation system 208 generates a media overlay that includes the uploaded content and associates the uploaded content with the selected geolocation.

In another example embodiment, the annotation system 208 provides a merchant-based publication platform that enables merchants to select a particular media overlay associated with a geolocation via a bidding process. For example, the annotation system 208 associates the media overlay of a highest bidding merchant with a corresponding geolocation for a predefined amount of time.

Figure 3:
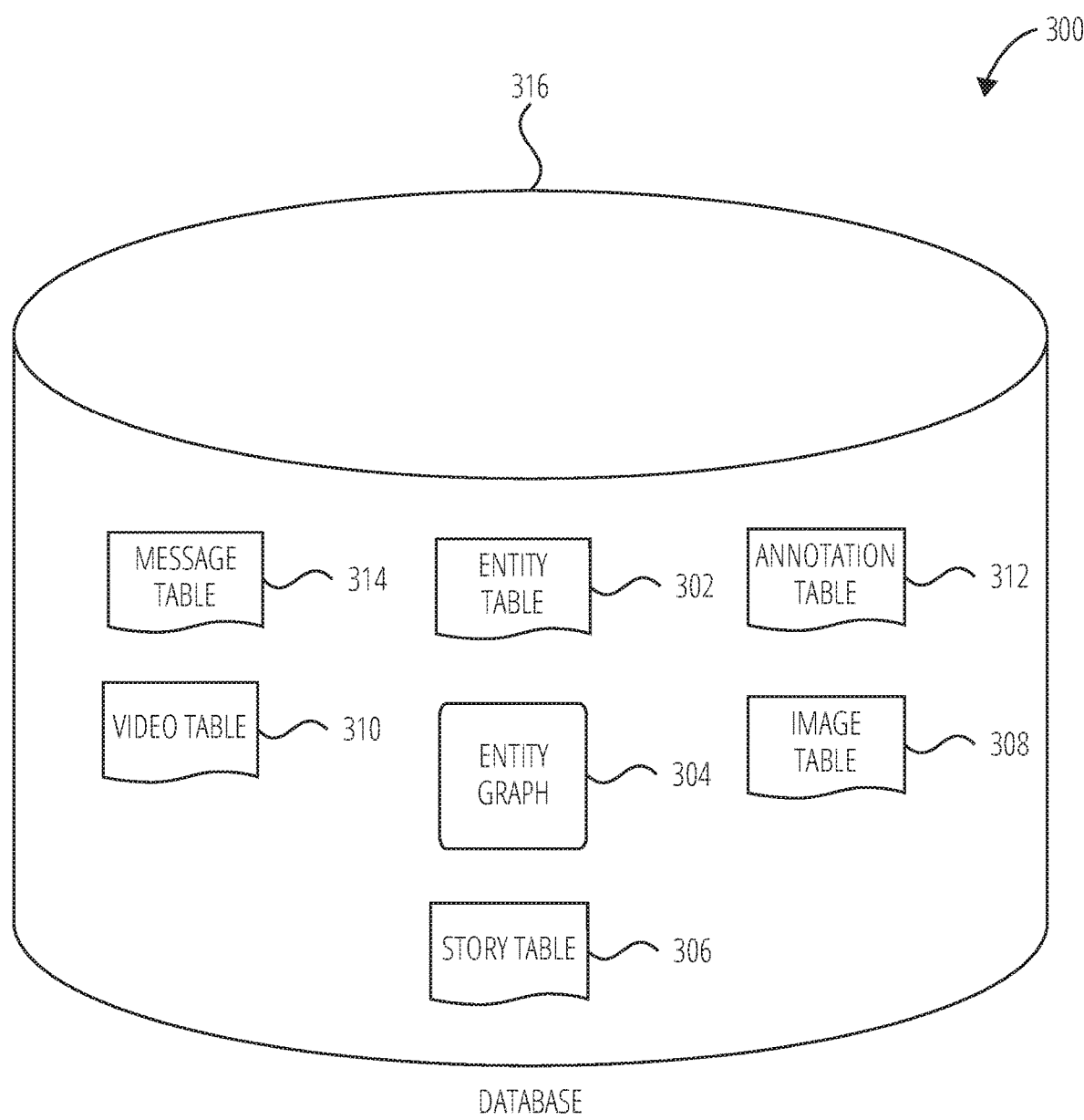
FIG. 3 is a schematic diagram illustrating data which may be stored in the database of the messaging server system, according to certain example embodiments.

FIG. 3 is a schematic diagram illustrating data 300 which may be stored in the database 316 of the messaging server system 108, according to certain example embodiments. While the content of the database 316 is shown to comprise a number of tables, it will be appreciated that the data could be stored in other types of data structures (e.g., as an object-oriented database).

The database 316 includes message data stored within a message table 314. The entity table 302 stores entity data, including an entity graph 304. Entities for which records are maintained within the entity table 302 may include individuals, corporate entities, organizations, objects, places, events etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between entities. Such relationships may be social, professional (e.g., work at a common corporation or organization) interested-based or activity-based, merely for example.

The database 316 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of varies types, including a user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a GPS unit of the client device 102. Another type of filter is a data filter, which may be selectively presented to a sending user by the messaging client application 104, based on other inputs or information gathered by the client device 102 during the message creation process. Example of data filters include current temperature at a specific location, a current speed at which a sending user is traveling, battery life for a client device 102 or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

A story table 306 stores data regarding collections of messages and associated image, video or audio data, which are compiled into a collection (e.g., a story or a gallery). The creation of a particular collection may be initiated by a particular user (e.g., each user for which a record is maintained in the entity table 302) A user may create a "personal story" in the form of a collection of content that has been created and sent/broadcast by that user. To this end, the user interface of the messaging client application 104 may include an icon that is user selectable to enable a sending user to add specific content to his or her personal story.

A collection may also constitute a "live story," which is a collection of content from multiple users that is created manually, automatically or using a combination of manual and automatic techniques. For example, a "live story" may constitute a curated stream of user-submitted content from varies locations and events. Users, whose client devices have location services enabled and are at a common location event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
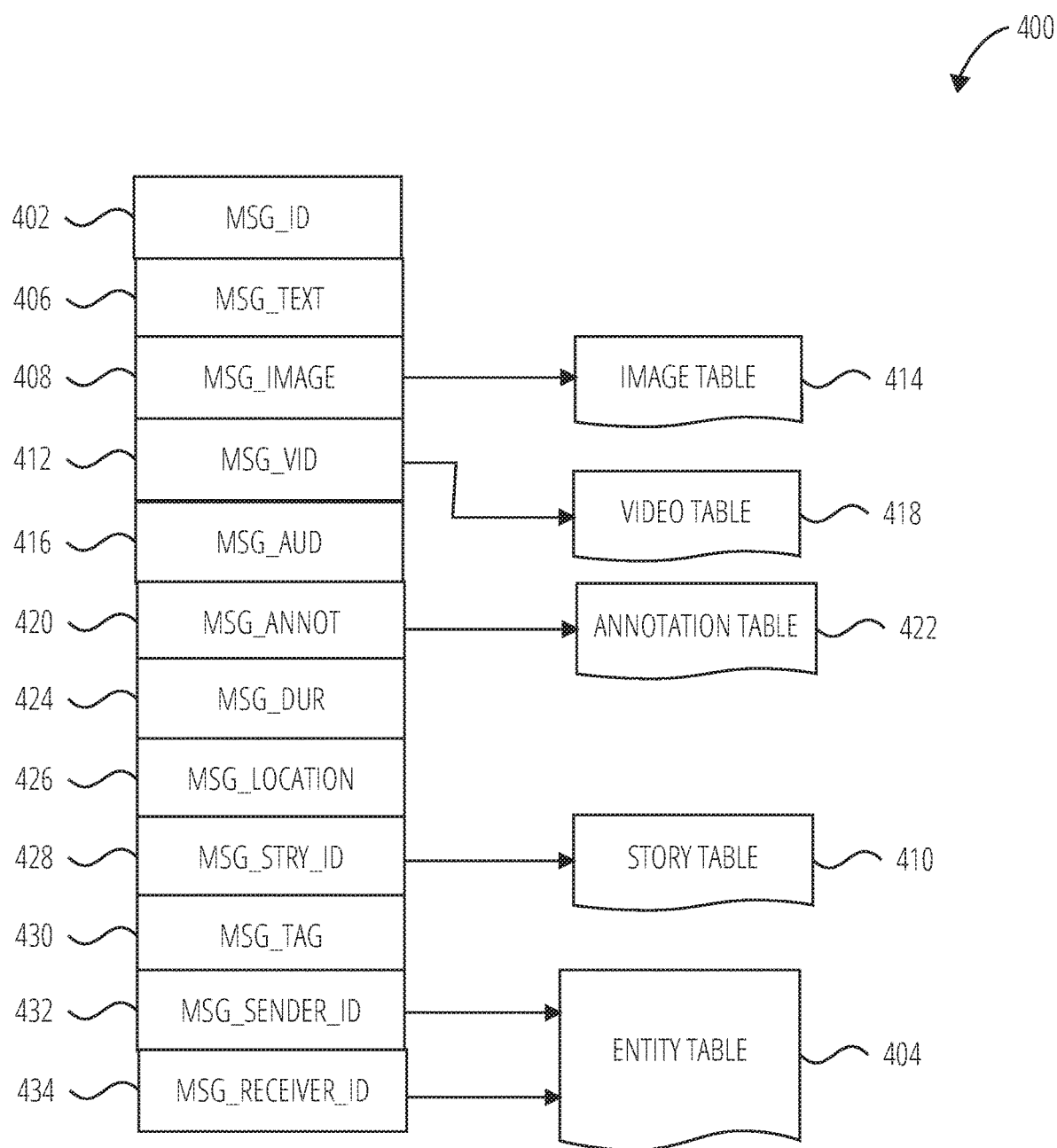
FIG. 4 is a schematic diagram illustrating a structure of a message, according to some embodiments, generated by a messaging client application for communication.

FIG. 4 is a schematic diagram illustrating a structure of a message 400, according to some in some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 406: text, to be generated by a user via a user interface of the client device 102 and that is included in the message 400
- A message image payload 408: image data, captured by a camera component of a client device 102 or retrieved from memory of a client device 102, and that is included in the message 400.
- A message video payload 412: video data, captured by a camera component or retrieved from a memory component of the client device 102 and that is included in the message 400.
- A message audio payload 416: audio data, captured by a microphone or retrieved from the memory component of the client device 102, and that is included in the message 400.
- A message annotation 420: annotation data (e.g., filters, stickers or other enhancements) that represents annotations to be applied to message image payload 408, message video payload 412, or message audio payload 416 of the message 400.
- A message duration parameter 424: parameter value indicating, in seconds, the amount of time for which content of the message (e.g., the message image payload 408, message video payload 412, message audio payload 416) is to be presented or made accessible to a user via the messaging client application 104.
- A message geolocation parameter 426: geolocation data (e.g., latitudinal and longitudinal coordinates) associated with the content payload of the message. Multiple message geolocation parameter 426 values may be included in the payload, each of these parameter values being associated with respect to content items included in the content (e.g., a specific image into within the message image payload 408, or a specific video in the message video payload 412).
- A message story identifier 428: identifier values identifying one or more content collections (e.g., "stories") with which a particular content item in the message image payload 408 of the message 400 is associated. For example, multiple images within the message image payload 408 may each be associated with multiple content collections using identifier values.
- A message tag 430: each message 400 may be tagged with multiple tags, each of which is indicative of the subject matter of content included in the message payload. For example, where a particular image included in the message image payload 408 depicts an animal (e.g., a lion), a tag value may be included within the message tag 430 that is indicative of the relevant animal. Tag values may be generated manually, based on user input, or may be automatically generated using, for example, image recognition.
- A message sender identifier 432: an identifier (e.g., a messaging system identifier, email address or device identifier) indicative of a user of the client device 102 on which the message 400 was generated and from which the message 400 was sent
- A message receiver identifier 434: an identifier (e.g., a messaging system identifier, email address or device identifier) indicative of a user of the client device 102 to which the message 400 is addressed.

The contents (e.g., values) of the various components of message 400 may be pointers to locations in tables within which content data values are stored. For example, an image value in the message image payload 408 may be a pointer to (or address of) a location within an image table 414. Similarly, values within the message video payload 412 may point to data stored within a video table 418, values stored within the message annotations 420 may point to data stored in an annotation table 422, values stored within the message story identifier 428 may point to data stored in a story table 410, and values stored within the message sender identifier 432 and the message receiver identifier 434 may point to user records stored within an entity table 404.

Figure 5:
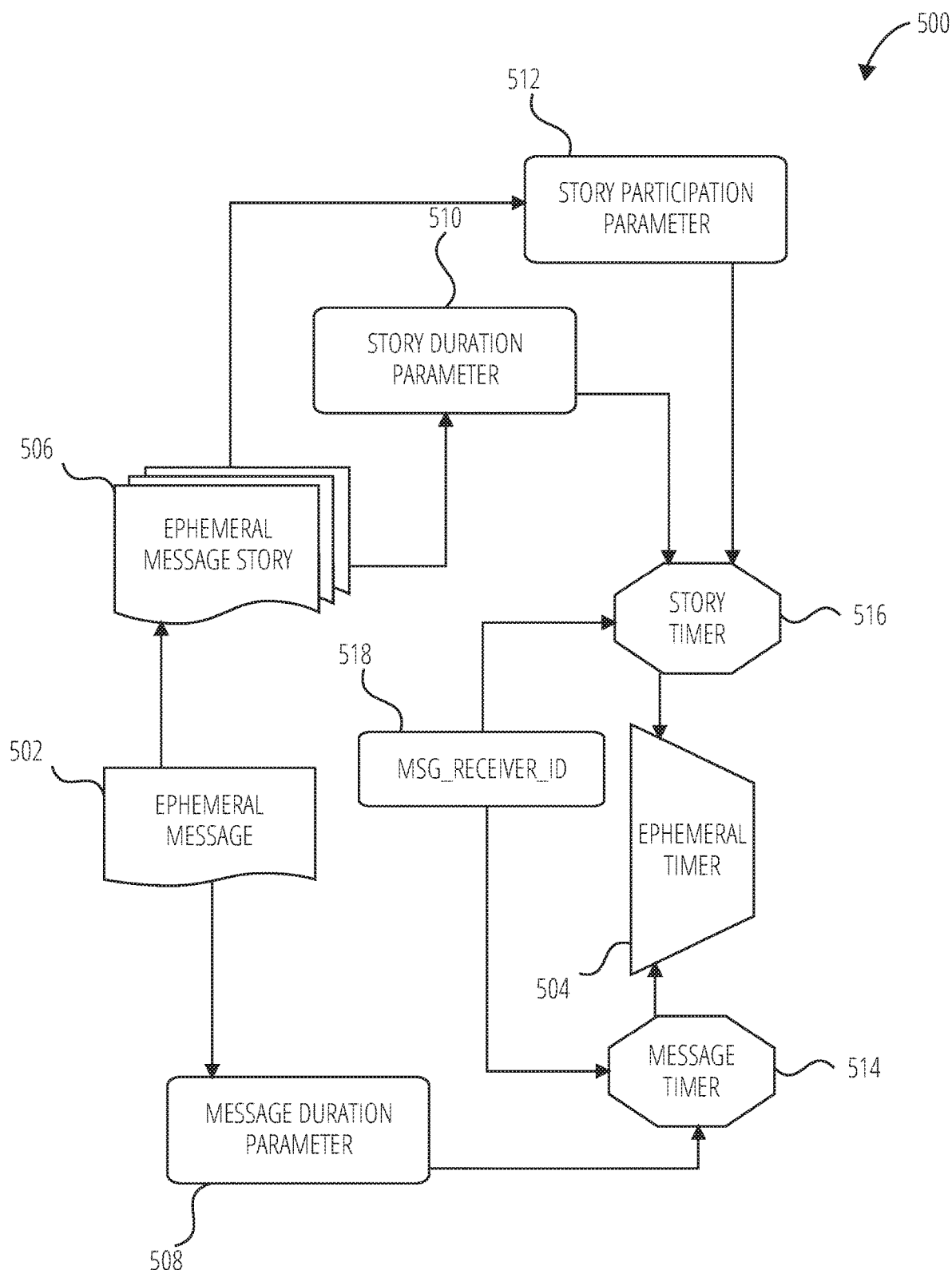
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 506) may be time-limited (e.g., made ephemeral).

An ephemeral message 502 is shown to be associated with a message duration parameter 508, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 508.

The message duration parameter 508 and the message receiver identifier 518 are shown to be inputs to a message timer 514, which is responsible for determining the amount of time that the ephemeral message 502 is shown to a particular receiving user identified by the message receiver identifier 518. In particular, the ephemeral message 502 will only be shown to the relevant receiving user for a time period determined by the value of the message duration parameter 508. The message timer 514 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 506 (e.g., a personal story, or an event story). The ephemeral message story 506 has an associated story duration parameter 510, a value of which determines a time-duration for which the ephemeral message story 506 is presented and accessible to users of the messaging system 100. The story duration parameter 510, for example, may be the duration of a music concert, where the ephemeral message story 506 is a collection of content pertaining to that concert. Alternatively, a user (either the owning user or a curator user) may specify the value for the story duration parameter 510 when performing the setup and creation of the ephemeral message story 506.

Additionally, each ephemeral message 502 within the ephemeral message story 506 has an associated story participation parameter 512, a value of which determines the duration of time for which the ephemeral message 502 will be accessible within the context of the ephemeral message story 506. Accordingly, a particular ephemeral message story 506 may "expire" and become inaccessible within the context of the ephemeral message story 506, prior to the ephemeral message story 506 itself expiring in terms of the story duration parameter 510. The story duration parameter 510, story participation parameter 512, and message receiver identifier 518 each provide input to a story timer 516, which operationally determines, firstly, whether a particular ephemeral message 502 of the ephemeral message story 506 will be displayed to a particular receiving user and, if so, for how long. Note that the ephemeral message story 506 is also aware of the identity of the particular receiving user as a result of the message receiver identifier 518.

Accordingly, the story timer 516 operationally controls the overall lifespan of an associated ephemeral message story 506, as well as an individual ephemeral message 502 included in the ephemeral message story 506. In one embodiment, each ephemeral message 502 within the ephemeral message story 506 remains viewable and accessible for a time-period specified by the story duration parameter 510. In a further embodiment, a certain ephemeral message 502 may expire, within the context of ephemeral message story 506, based on a story participation parameter 512. Note that a message duration parameter 508 may still determine the duration of time for which a particular ephemeral message 502 is displayed to a receiving user, even within the context of the ephemeral message story 506. Accordingly, the message duration parameter 508 determines the duration of time that a particular ephemeral message 502 is displayed to a receiving user, regardless of whether the receiving user is viewing that ephemeral message 502 inside or outside the context of an ephemeral message story 506.

The ephemeral timer 504 may furthermore operationally remove a particular ephemeral message 502 from the ephemeral message story 506 based on a determination that it has exceeded an associated story participation parameter 512. For example, when a sending user has established a story participation parameter 512 of 24 hours from posting, the ephemeral timer 504 will remove the relevant ephemeral message 502 from the ephemeral message story 506 after the specified 24 hours. The ephemeral timer 504 also operates to remove an ephemeral message story 506 either when the story participation parameter 512 for each and every ephemeral message 502 within the ephemeral message story 506 has expired, or when the ephemeral message story 506 itself has expired in terms of the story duration parameter 510.

In certain use cases, a creator of a particular ephemeral message story 506 may specify an indefinite story duration parameter 510. In this case, the expiration of the story participation parameter 512 for the last remaining ephemeral message 502 within the ephemeral message story 506 will determine when the ephemeral message story 506 itself expires. In this case, a new ephemeral message 502, added to the ephemeral message story 506, with a new story participation parameter 512, effectively extends the life of an ephemeral message story 506 to equal the value of the story participation parameter 512.

Responsive to the ephemeral timer 504 determining that an ephemeral message story 506 has expired (e.g., is no longer accessible), the ephemeral timer system 202 communicates with the messaging system 100 (and, for example, specifically the messaging client application 104 to cause an indicium (e.g., an icon) associated with the relevant ephemeral message story 506 to no longer be displayed within a user interface of the messaging client application 104. Similarly, when the ephemeral timer system 202 determines that the message duration parameter 508 for a particular ephemeral message 502 has expired, the ephemeral timer system 202 causes the messaging client application 104 to no longer display an indicium (e.g., an icon or textual identification) associated with the ephemeral message 502.

Figure 6:
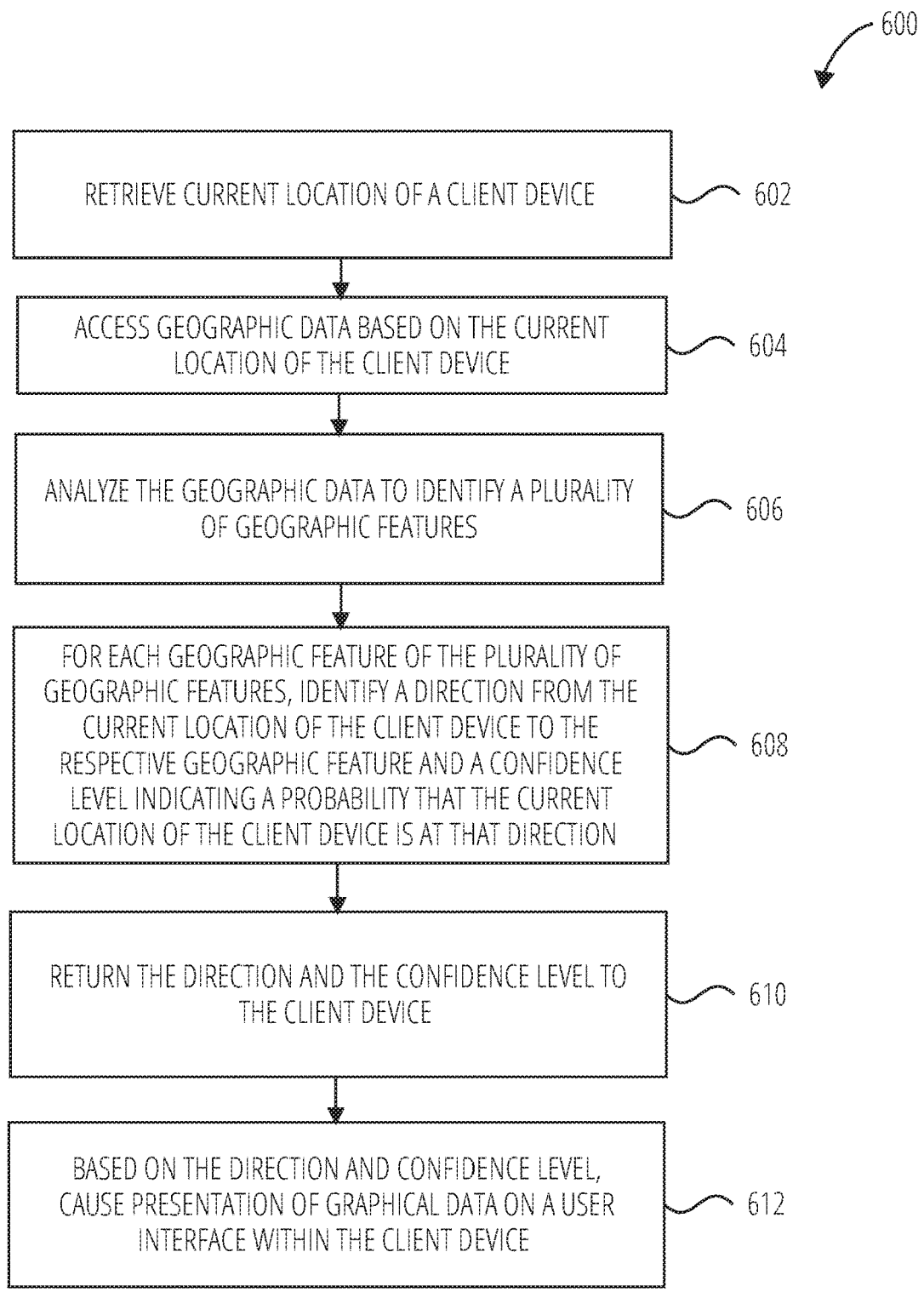
FIG. 6 is a flow diagram illustrating an example position service system in accordance with one embodiment.

FIG. 6 is a flow diagram illustrating a method 600, as may be performed by the positioning server system 124, to determine position relative to map features. At operation 602, the position service system 124 retrieves the current location of a client device 102 associated with a user. As shown in FIG. 1, the position service system 124 may be integrated within an application server 112, and also coupled to a messaging server application 114, an image processing system 116, and a social network system 122. A position service system 124 may use information retrieved from position 1238 components on the client device 102 to retrieve the current location of the client device 102, at operation 602. In one example embodiment, the position service system 124 returns a user's position relative to map features, such as roads, buildings, and bodies of water.

Figure 7:
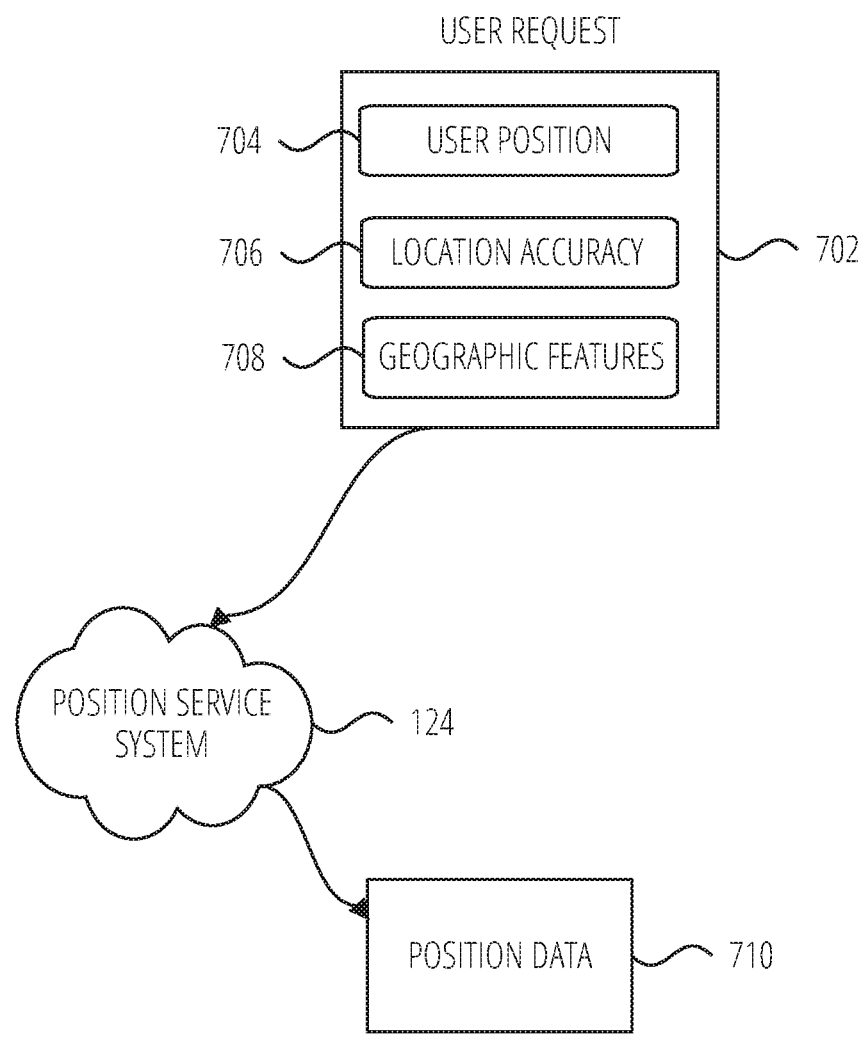
FIG. 7 is a block diagram illustrating a position service system according to some example embodiments.

Further details regarding sub-operations performed at operation 602-operation 612 are described with reference to FIG. 7-FIG. 11 below. FIG. 7 is a block diagram illustrating a position service system according to some example embodiments. In operation 602, the position service system 124 receives a user request 702 as input from a client device 102. The user request 702 may be sent through a messaging client application 104 from a client device 102 via a network 106. The user request 702 may include the user position 704, and location accuracy 706. The position service system 124 may use GPS functionality on the client device 102 to determine the user position 704 (e.g., Cartesian coordinates) and location accuracy 706. The location accuracy 706 may define a geographic region on a map representing degree of certainty information regarding the user position 704. For example, the user position 704 may be represented by a circle with an area, although the user is actually positioned at a point within the circle. The position service system 124 utilizes the information received in the user request 702 to output position data 708. The position data 708 includes information about the user's position relative to map features, such as roads, buildings, and bodies of water. The position service system 124 is described in further detail below.

The position service system 124 outputs position data 708 related to the input user request 702. In some example embodiments the position data 708 includes identifies a direction from a current location of the user to the geographic features. The direction may include a distance and a bearing angle. In another example embodiment, the position data 708 identifies a location accuracy that the current location of a device is at the identified direction. In some example embodiments, the location accuracy is a probability that the current location of the device is at the identified direction.

Figure 8:
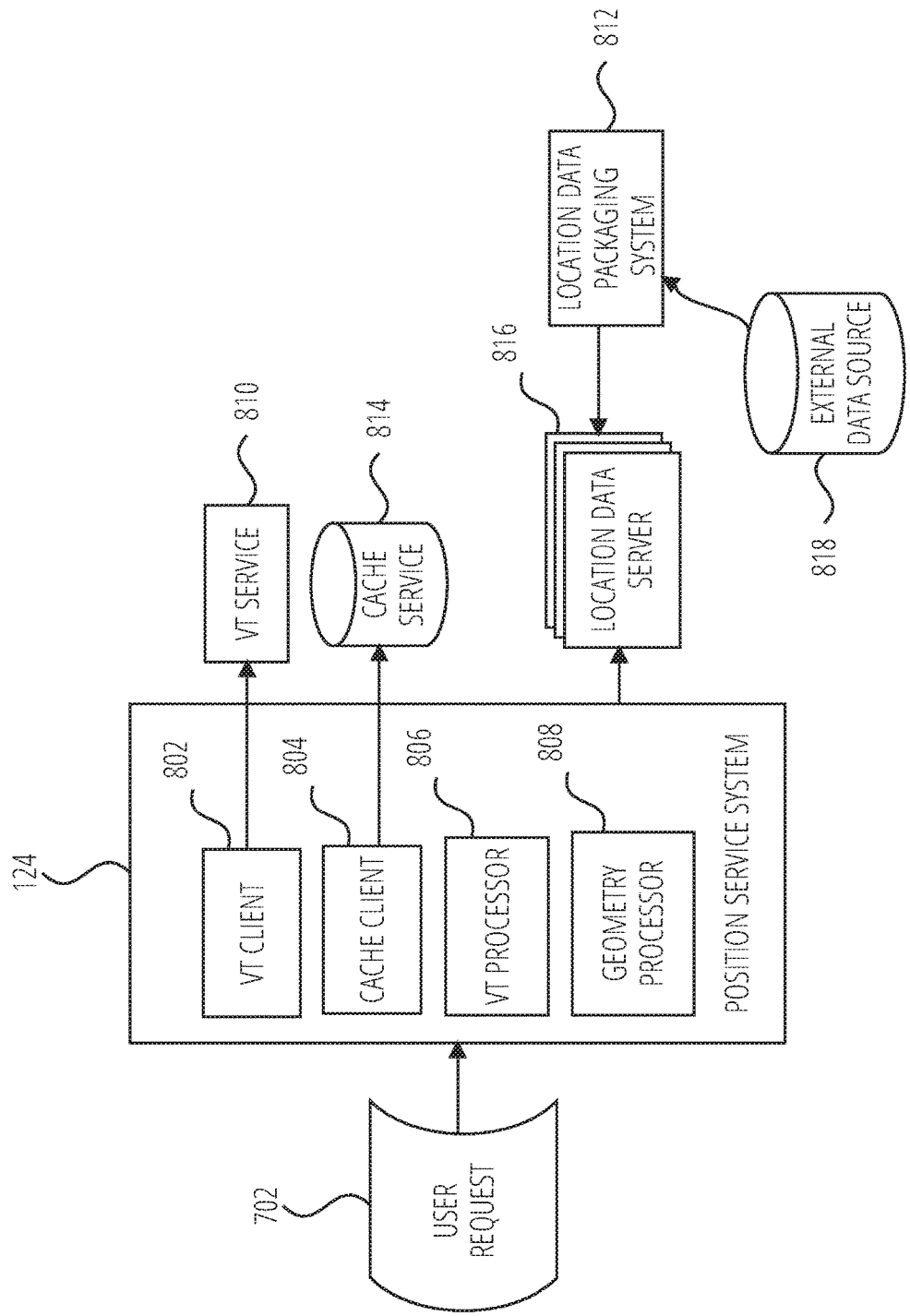
FIG. 8 is a block diagram illustrating a position service system architecture, according to an example embodiment.

FIG. 8 is a diagram illustrating an architecture of position service system 124 according to some example embodiments. The position service system 124 may receive a user request 702 as input and outputs position data 708. The position service system 124 is shown to include a number of components, including a vector tile client 702, cache client 804, vector tile processor 708, and a geometry processor 808. The position service system 124 may be coupled to a location data server 816.

Returning to FIG. 6, once the position service system 124 receives information about the user's location in operation 602, the position service system 124 may load geographic data relevant to the user's location. In operation 604, the position service system 124 may access geographic data based on the current location of the client device. The position service system 124 loads processed geographic data and uses that processed data to return position data 708 based on the information contained in the user request 702.

Specifically, the vector tile client 702 may interact with a vector tile service 710 to retrieve processed vector tiles. Vector tiles are packets of geographic data, packaged into roughly square-shaped "tiles." Each tile corresponds to geographic areas of a pre-defined size and location.

The cache client 804 caches vector tiles retrieved from the vector tile service 710 at a cache implementation such as the cache service 814 to improve efficiency of the position service system 124. Operationally, the position service system 124 attempts to retrieve processed vector tiles from the cache service 814, if available. If the processed vector tiles are not available from the cache service 814, the position service system 124 will retrieve vector tiles from the vector tile service 710.

In an example embodiment, the position service system 124 processes additional geographic data, such as contextual location data. The contextual location data may not be readily available in the form of processed vector tiles. Contextual location data may include information such as zip codes, congressional districts and administrative borders. To process the contextual location data, the position service system 124 may load data from the location data server 816. The location data server 816 retrieves the contextual location data from the location data packaging system 812 which processes the contextual location data from the external data source 818 and converts the contextual location data into a processed vector tile format. In one example embodiment, position service system 124 processes both types of geographic data simultaneously. Both types of data may be processed separately, in parallel.

Each processed tile further contains geographic features such as roads, buildings, airports and national parks. At operation 606, the position service system 124 analyzes the geographic data to identify multiple geographic features. In one example embodiment, the geographic features are map type features. Map type features may be, for example, roads, buildings and bodies of water. In another example embodiment, the geographic features are venue type features. Venue type features include venues such as coffee shops and golf courses. In another example embodiment the geographic features 708 may be related to other various map-related data.

The geographic features are furthermore prioritized before sent to the position service system 124. The prioritization may be performed by the messaging server application 114. The features may be prioritized based on their proximity, type and popularity.

The geographic features are associated with a geometry type (e.g. Point, line, or polygon). Some geographic feature may have geometry types that are specific to them. For example, bodies of water are polygons and roads are lines. Some geographic features may be associated with multiple geometry types. For example, a coffee shop or a golf course may be a point or a polygon. A point geometry type indicates a lack of geographic information regarding the feature.

Figure 9:
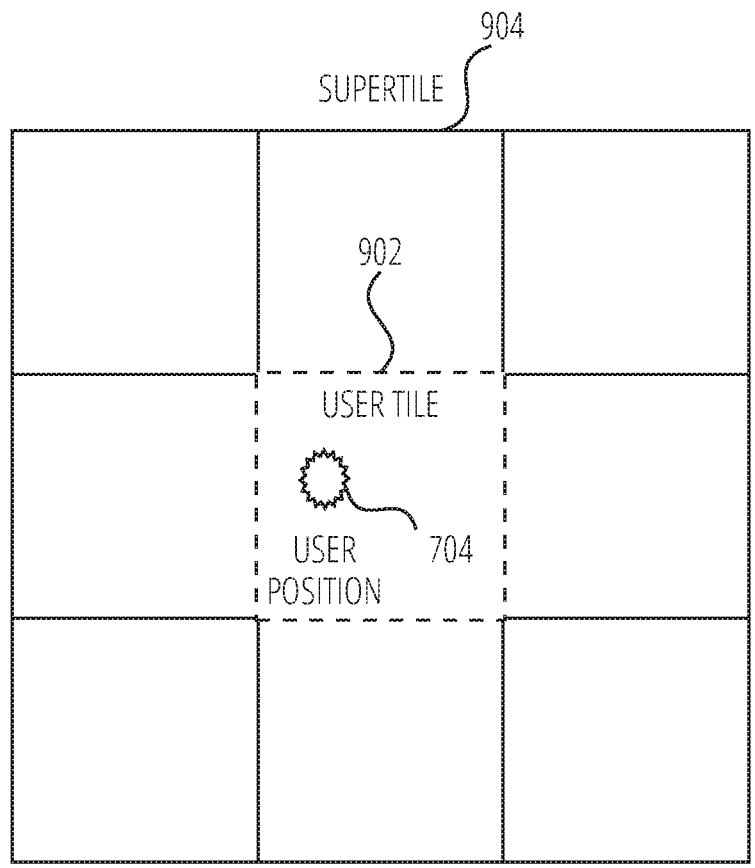
FIG. 9 is a diagrammatic illustration showing a user location within vector tiles, according to an example embodiment.

At operation 608, the position service system 124 identifies a direction from the current location of the client device to one or more geographic features and a confidence level indicating the probability that the current location of the device is at that direction. Referring to FIG. 9, for each current location of a device, the position service system 124 obtains a so-called supertile 904, which is made of a user tile 902 and up to eight tiles around (e.g., immediately adjacent to) the user tile 902. A user position 704 is associated with the current location of the device. The position service system 124 analyzes features close to the user position 704 and disregards the Earth's curvature. The position service system 124 may define a horizon value, which is the maximum distance to the user position 704 the position data 708 can be returned responsive to the user request 702. The horizon value is compared with the distance to the borders and corners of the user tile 902. The vector tile processor 706, then combines all tiles into a supertile 904.

Figure 10:
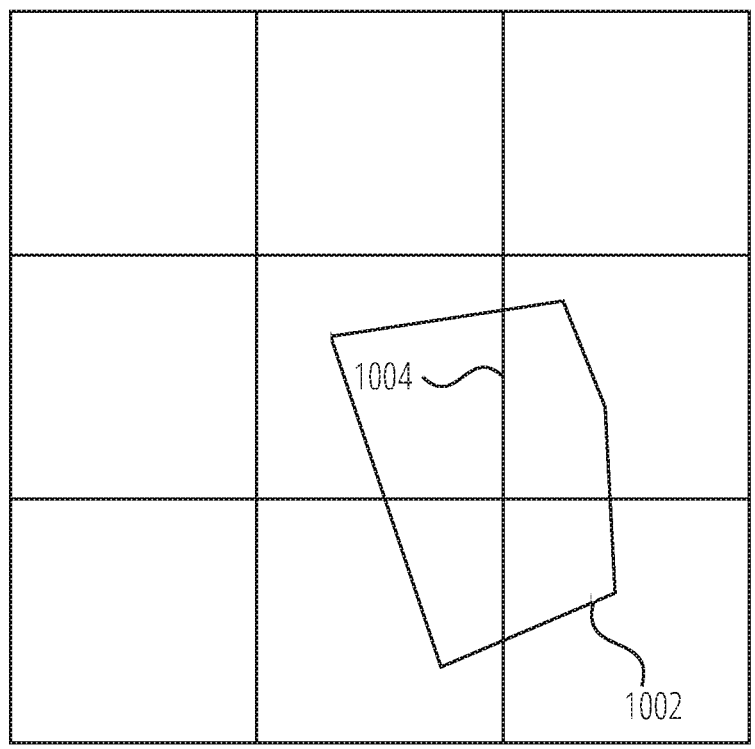
FIG. 10 is a diagrammatic illustration showing a polygon split between vector tiles, according to an example embodiment.
Figure 11:
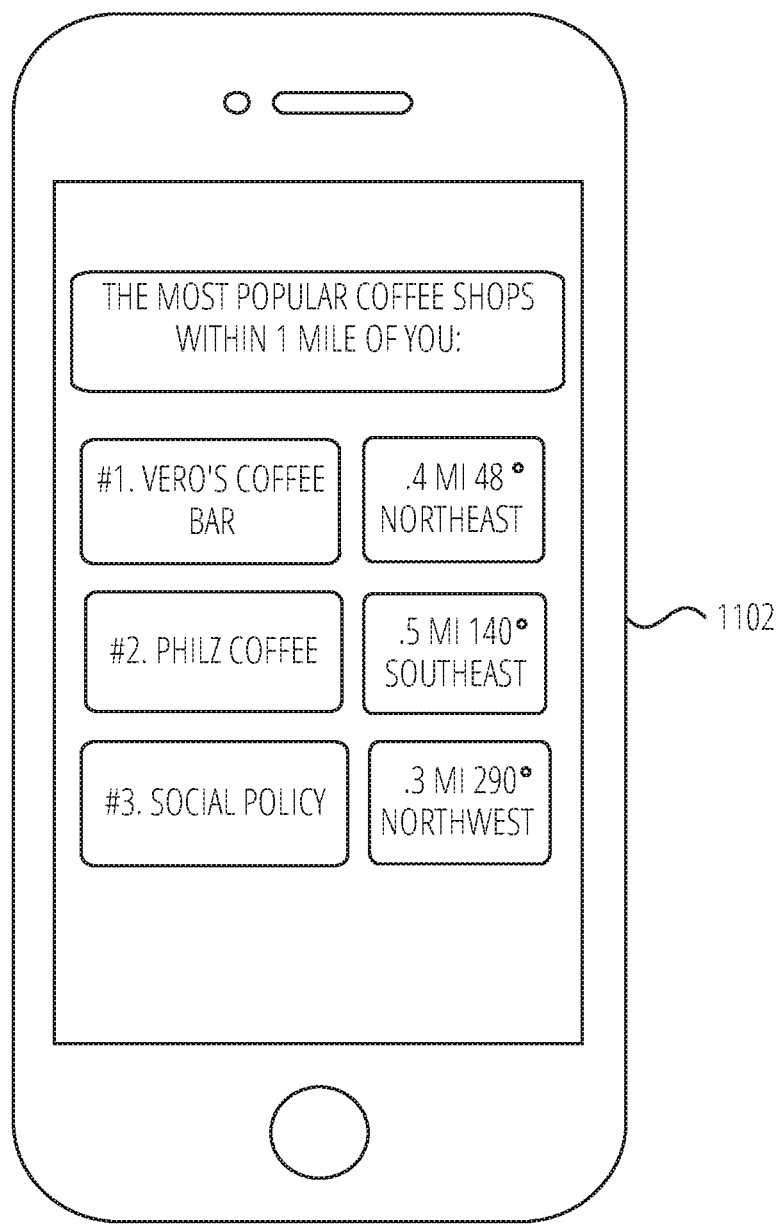
FIG. 11 is a diagrammatic illustration showing an application of the position service system on a graphical user interface on a client device, according to an example embodiment.

The position service system 124 converts all the points, lines and polygons of the relevant geographic features into Cartesian coordinates relative to the north-west corner of the user tile 902. A polygon may be split between vector tiles. Referring to FIG. 10, if a polygon is split between vector tiles, the position service system 124 may need to distinguish between "real" edges 1002 and "fake" edges 1004. Fake edges 1004 are formed when the position service system 124 computes the intersection of the polygon with the vector tile. In some example embodiments, "fake" edges 1004 are not considered, and the "real" edges 1002 are considered, when calculating the distance to the nearest polygon boundary. In another example embodiment, "fake" edges 1004 are used to determine if a point is within a polygon. Furthermore, constructing the supertile 904 may improve performance of the position service system 124 because it accounts for a user position 704 that is close to a border of a polygon.

The geometry processor 808 of the position service system 124 is responsible for extracting position data from the points, lines and polygons of the user request 702. The geometry processor 808 analyzes each tile and user request 702 apparent in each tile. For example, a request sent to the position service system 124 may be to find the closest road to a user. Because roads are of the geometry type line, the geometry processor 808 analyzes all lines within the supertile 904 and calculates the distance between the user position 704 and each line within the supertile 904. The geometry processor 808 may sort the distances and determine the closest line to the user position 704. The geometry processor 808 may also determine the bearing between the user position 704 and the closest line. The geometry processor 808 may also determine the orientation of the line.

The geometry processor 808 further determines a confidence level of the user being at an identified location. The confidence level may be represented as a probability. The probability may be defined using the polygon shape and the user position 704. In some example embodiments, the geometry processor 808 uses the geometry of the requested features and computes an inaccuracy radius around the user location. For example, the geometry processor 808 may compute the fraction of the inaccuracy radius that falls within the geometry of the requested feature 602. The geometry processor 808 may then return that fraction as a probability that the user is at the identified direction and bearing relative to the requested feature 602.

The position service system 124 may transmit the position data 708 to the messaging client application 104, as part of user interface data, for presentation on a graphical user interface presented by the messaging client application 104. For example, a user may request the position service system 124 for a list of the most popular coffee shops within one mile of her. The messaging client application 104 may present the position data 708 as a list on a client device 1102 (see FIG. 11). The messaging client application 104 may present the position data 708 using an avatar representing a user of the client device 1002. For example, if the position service system 124 determines that a user is on a plane, crossing the Pacific Ocean, the messaging client application 104 may display an avatar of the user sitting in a plane, on a map presented on a graphical user interface of a client device. In another example embodiment, the messaging client application 104 may present the position data 708 in the form of images or overlay elements. For example, if a user is at a venue, such as the Staples Center, the messaging client application 104 may display an avatar of the user dressed in a Lakers jersey within a graphical user interface on a client device. The messaging client application 104 may also transmit the position data 708 as an ephemeral message 502 or an ephemeral message story 506 within the messaging client application 104.

Figure 12:
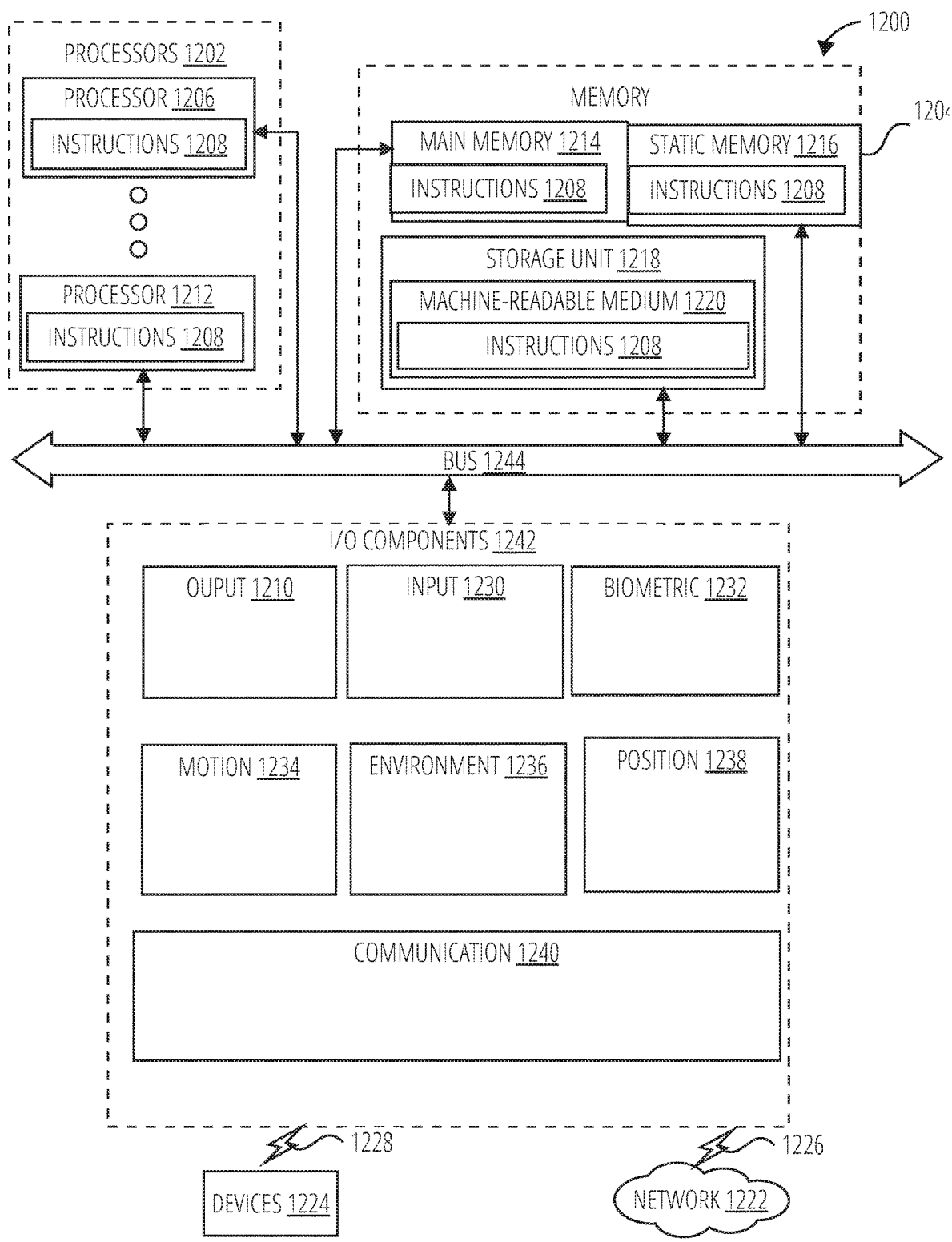
FIG. 12 is a diagrammatic representation of a machine in the form of a computer system within which a set of instructions may be executed for causing the machine to perform any one or more of the methodologies discussed herein, in accordance with some example embodiments.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In an example embodiment, the processors 1202 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1212 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1214, a static memory 1216, and a storage unit 1218, both accessible to the processors 1202 via the bus 1244. The main memory 1204, the static memory 1216, and storage unit 1218 store the instructions 1208 embodying any one or more of the methodologies or functions described herein. The instructions 1208 may also reside, completely or partially, within the main memory 1214, within the static memory 1216, within machine-readable medium 1220 within the storage unit 1218, within at least one of the processors 1202 (e.g., within the processor's cache memory), or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various example embodiments, the I/O components 1242 may include output components 1210 and input components 1230. The output components 1210 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1242 further include communication components 1240 operable to couple the machine 1200 to a network 1222 or devices 1224 via a coupling 1226 and a coupling 1228, respectively. For example, the communication components 1240 may include a network interface component or another suitable device to interface with the network 1222. In further examples, the communication components 1240 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1224 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code. Data Matrix. Dataglyph, MaxiCode, PDF417, Ultra Code. UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi® signal triangulation, location via detecting an NFC beacon signal that may indicate a particular location, and so forth.

The various memories (e.g., memory 1204, main memory 1214, static memory 1216, and/or memory of the processors 1202) and/or storage unit 1218 may store one or more sets of instructions and data structures (e.g., software) embodying or used by any one or more of the methodologies or functions described herein. These instructions (e.g., the instructions 1208), when executed by processors 1202, cause various operations to implement the disclosed embodiments.

The instructions 1208 may be transmitted or received over the network 1222, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1228 (e.g., a peer-to-peer coupling) to the devices 1224.

Figure 13:
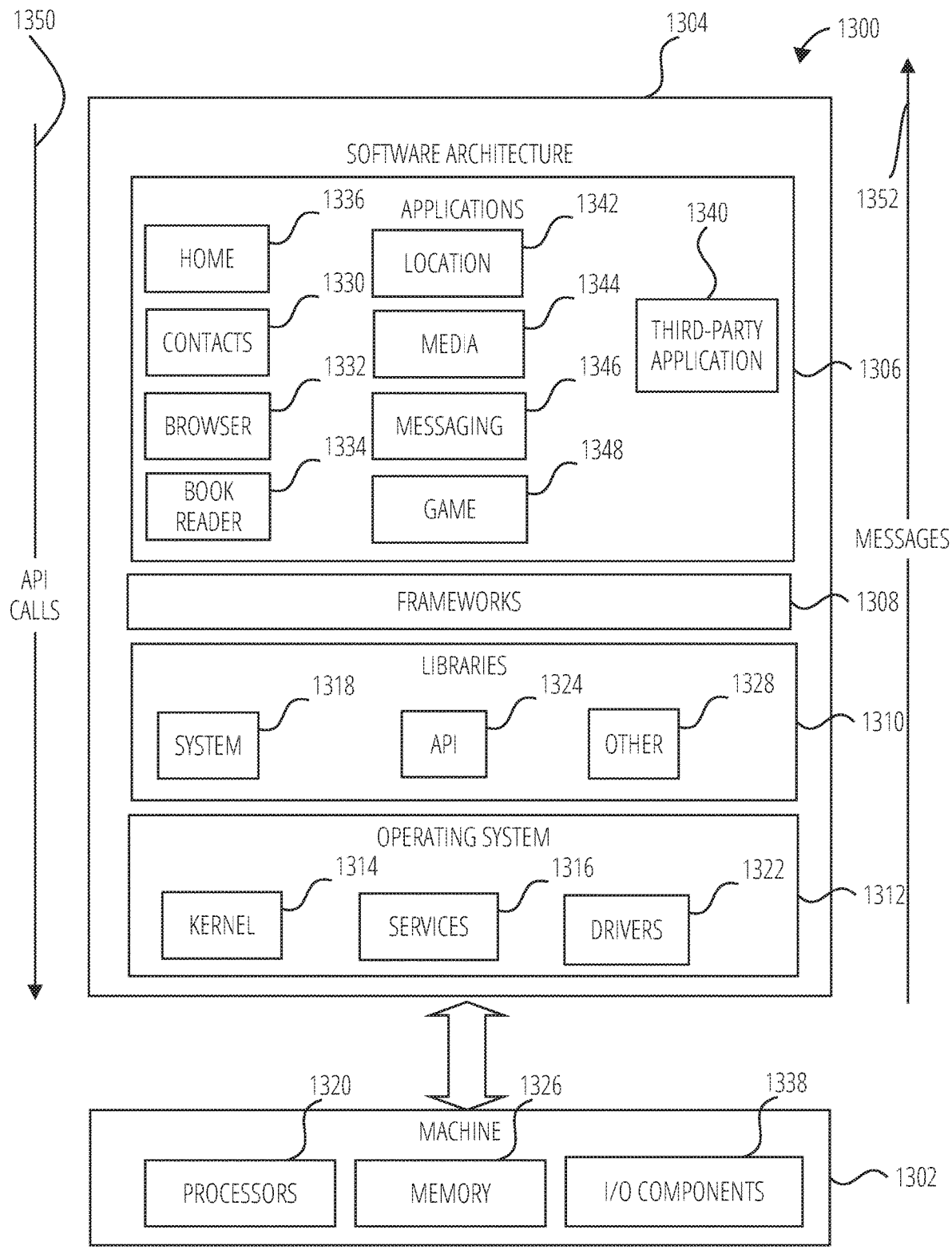
FIG. 13 is block diagram showing a software architecture within which the present disclosure may be implemented, in accordance with some example embodiments.

FIG. 13 is a block diagram 1300 illustrating a software architecture 1304, which can be installed on any one or more of the devices described herein. The software architecture 1304 is supported by hardware such as a machine 1302 that includes processors 1320, memory 1326, and I/O components 1338. In this example, the software architecture 1304 can be conceptualized as a stack of layers, where each layer provides a particular functionality. The software architecture 1304 includes layers such as an operating system 1312, libraries 1310, frameworks 1308, and applications 1306. Operationally, the applications 1306 invoke API calls 1350 through the software stack and receive messages 1352 in response to the API calls 1350.

The operating system 1312 manages hardware resources and provides common services. The operating system 1312 includes, for example, a kernel 1314, services 1316, and drivers 1322. The kernel 1314 acts as an abstraction layer between the hardware and the other software layers. For example, the kernel 1314 provides memory management, processor management (e.g., scheduling), component management, networking, and security settings, among other functionality. The services 1316 can provide other common services for the other software layers. The drivers 1322 are responsible for controlling or interfacing with the underlying hardware. For instance, the drivers 1322 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1310 provide a low-level common infrastructure used by the applications 1306. The libraries 1310 can include system libraries 1318 (e.g., C standard library) that provide functions such as memory allocation functions, string manipulation functions, mathematic functions, and the like. In addition, the libraries 1310 can include API libraries 1324 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1310 can also include a wide variety of other libraries 1328 to provide many other APIs to the applications 1306.

The frameworks 1308 provide a high-level common infrastructure that is used by the applications 1306. For example, the frameworks 1308 provide various graphical user interface (GUI) functions, high-level resource management, and high-level location services. The frameworks 1308 can provide a broad spectrum of other APIs that can be used by the applications 1306, some of which may be specific to a particular operating system or platform.

In an example embodiment, the applications 1306 may include a home application 1336, a contacts application 1330, a browser application 1332, a book reader application 1334, a location application 1342, a media application 1344, a messaging application 1346, a game application 1348, and a broad assortment of other applications such as a third-party application 1340. The c applications 1306 are programs that execute functions defined in the programs. Various programming languages can be employed to create one or more of the applications 1306, structured in a variety of manners, such as object-oriented programming languages (e.g., Objective-C. Java. or C++) or procedural programming languages (e.g., C or assembly language). In a specific example, the third-party application 1340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1340 can invoke the API calls 1350 provided by the operating system 1312 to facilitate functionality described herein.

What is claimed is:

1. A method comprising:
    retrieving, using one or more processors, a current location of a client device;
    generating an inaccuracy radius around the current location of the client device;
    accessing geographic data based on the current location of the client device;
    analyzing the geographic data to identify a plurality of geographic features;
    prioritizing each geographic feature of the identified plurality of geographic features based on proximity to the current location of the client device, type of geographic feature and popularity of the geographic feature;
    for each prioritized geographic feature of the plurality of prioritized geographic features, identifying a direction from the current location of the client device to the respective prioritized geographic feature, the direction comprising a distance and a bearing angle, and generating a confidence level indicating a probability that the current location of the client device is at the direction, the confidence level generated based on a geometry type of each prioritized geographic feature and a fraction of the inaccuracy radius that falls within the geometry type of each prioritized geographic feature;
    returning the direction and the confidence level to the client device; and
    based on the direction and confidence level, causing presentation of graphical data on a user interface within the client device.

2. The method of claim 1, wherein the plurality of geographic features is associated with a plurality of geometry types.

3. The method of claim 2, wherein the plurality of geometry types is a point, a line, or a polygon.

4. The method of claim 2, wherein identifying the plurality of geographic features further comprises disregarding one or more of the plurality of geometry types.

5. The method of claim 1, wherein identifying the plurality of features further comprises disregarding the plurality of features outside a maximum distance from the current location of the client device.

6. The method of claim 1, wherein the geographic data consists of a first type of geographic data and a second type of geographic data.

7. The method of claim 6, wherein the first type of geographic data is processed in parallel with the second type of geographic data.

8. The method of claim 1, wherein the graphical data represents a current activity of a user associated with the client device.

9. The method of claim 8, wherein the graphical data includes an icon associated with the user.

10. The method of claim 8, wherein the graphical data includes alphanumeric characters.

11. A system comprising:
    a processor; and
    a memory storing instructions that, when executed by the processor, configure the apparatus to:
    retrieve, using one or more processors, a current location of a client device;
    generate an inaccuracy radius around the current location of the client device;
    access geographic data based on the current location of the client device;
    analyze the geographic data to identify a plurality of geographic features;
    prioritize each geographic feature of the identified plurality of geographic features based on proximity to the current location of the client device, type of geographic feature and popularity of the geographic feature;
    for each prioritized geographic feature of the plurality of prioritized geographic features, identify a direction from the current location of the client device to the respective prioritized geographic feature, the direction comprising a distance and a bearing angle, and generate a confidence level indicating a probability that the current location of the client device is at the direction, the confidence level generated based on a geometry type of each prioritized geographic feature and a fraction of the inaccuracy radius that falls within the geometry type of each prioritized geographic feature;
    return the direction and the confidence level to the client device; and
    based on the direction and confidence level, cause presentation of graphical data on a user interface within the client device.

12. The system of claim 11, wherein the plurality of geographic features is associated with a plurality of geometry types.

13. The system of claim 12, wherein the plurality of geometry types is a point, a line, or a polygon.

14. The system of claim 12, wherein identifying the plurality of geographic features further comprises disregarding one or more of the plurality of geometry types.

15. The system of claim 11, wherein identifying the plurality of features further comprises disregard the plurality of features outside a maximum distance from the current location of the client device.

16. The system of claim 11, wherein the geographic data consists of a first type of geographic data and a second type of geographic data.

17. The system of claim 16, wherein the first type of geographic data is processed in parallel with the second type of geographic data.

18. The system of claim 11, wherein the graphical data represents a current activity of a user associated with the client device.

19. The system of claim 18, wherein the graphical data includes an icon associated with the user.

20. A non-transitory computer-readable storage medium, the computer-readable storage medium including instructions that when executed by a computer, cause the computer to:

- retrieve, using one or more processors, a current location of a client device;
- generate an inaccuracy radius around the current location of the client device;
- access geographic data based on the current location of the client device;
- analyze the geographic data to identify a plurality of geographic features;
- prioritize each geographic feature of the identified plurality of geographic features based on proximity to the current location of the client device, type of geographic feature and popularity of the geographic feature;
- for each prioritized geographic feature of the plurality of prioritized geographic features, identify a direction from the current location of the client device to the respective prioritized geographic feature, the direction comprising a distance and a bearing angle, and generate a confidence level indicating a probability that the current location of the client device is at the direction, the confidence level generated based on a geometry type of each prioritized geographic feature and a fraction of the inaccuracy radius that falls within the geometry type of each prioritized geographic feature;
- return the direction and the confidence level to the client device; and
- based on the direction and confidence level, cause presentation of graphical data on a user interface within the client device.

* * * * *